June 20, 1961 G. F. SCHROEDER ET AL 2,989,233

RHUMBLINE COURSE AND DISTANCE COMPUTER

Filed Oct. 29, 1958 4 Sheets-Sheet 1

RHUMBLINE COURSE AND DISTANCE COMPUTER

Filed Oct. 29, 1958 4 Sheets-Sheet 2

RHUMBLINE COURSE AND DISTANCE COMPUTER

Filed Oct. 29, 1958

June 20, 1961 G. F. SCHROEDER ET AL 2,989,233
RHUMBLINE COURSE AND DISTANCE COMPUTER
Filed Oct. 29, 1958 4 Sheets-Sheet 4
Fig. 4.
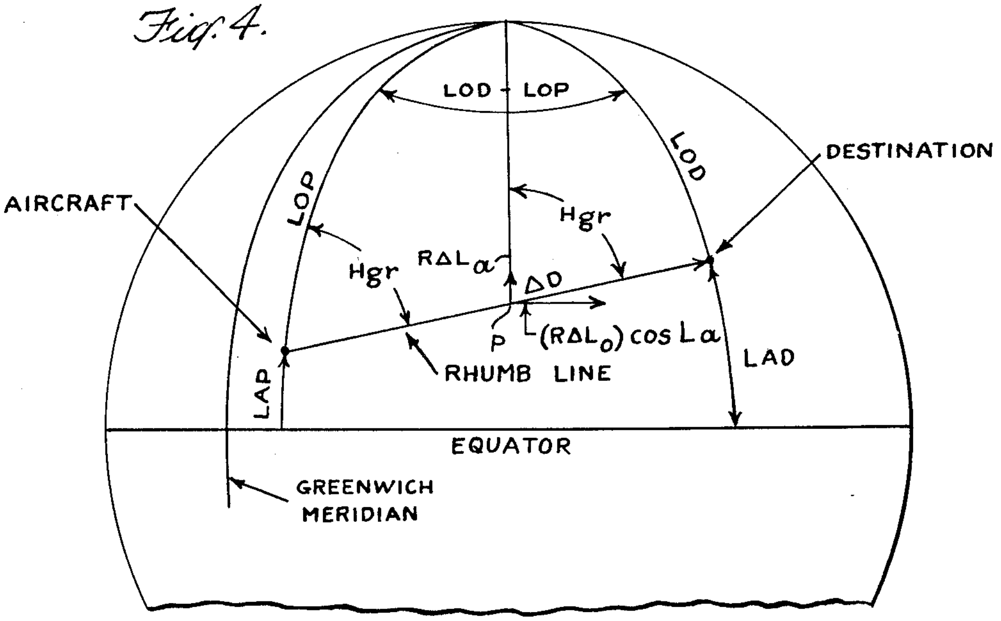
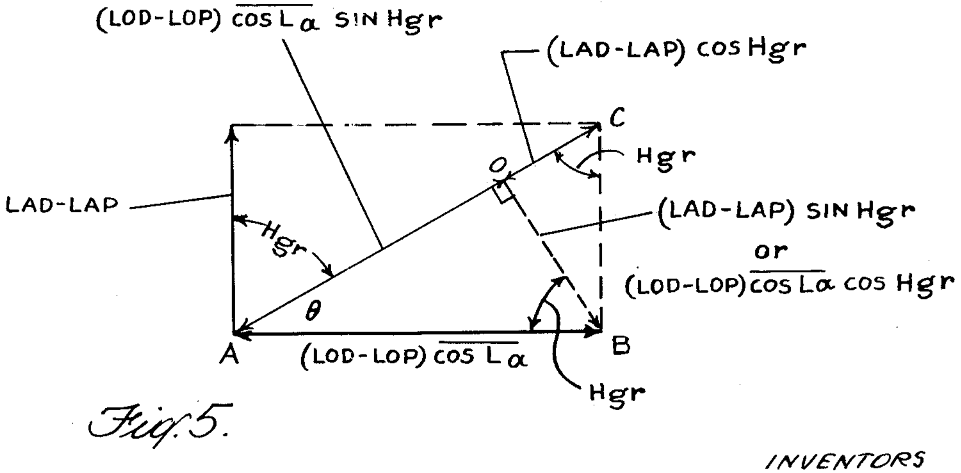
Fig. 5.
INVENTORS
GEORGE F. SCHROEDER
VICTOR H. SELIGER
STAMATES I. FRANN
ROBERT J. HARDIGAN
GEORGE A. LIESKE
BY Victor D. Borst
ATTORNEY United States Patent Office 2,989,233

Patented June 20, 1961

2,989,233

RHUMBLINE COURSE AND DISTANCE COMPUTER

George F. Schroeder, Pines Lake, N.J., and Victor H. Seliger, Kew Gardens, Stamates I. Frann, Whitestone, Robert J. Hardigan, Bronx, and George A. Lieske, Bayside, N.Y., assignors to Sperry Rand Corporation, Ford Instrument Company Division, Wilmington, Del., a corporation of Delaware Filed Oct. 29, 1958, Ser. No. 770,499
3 Claims. (Cl. 235—61)

The invention relates to a navigation computer for generating values for distance and course on a rhumb line.

The computer provides means for employing position quantities made available as by the computer described in copending application S.N. 607,101, now Patent No. 2,951,639, to generate values for distance and course heading on a rhumb line in accordance with certain derived formulations. The computer is mechanized so as to produce the desired quantities continuously or with interruptions to permit the introduction of adjusted input quantities either for the purpose of correction or of computing a different rhumb line. The system provides storing and switching units so that this type of selective operation may be effectuated during flight without the loss of any of the continuously produced position quantities required to be accounted for when the computer resumes its normal operation. Additionally, the system provides limiting means for preserving the computation of present position and for preventing jamming and breakdown in the computing potentiometers caused by their overrunning the limits of computation.

A better understanding of the navigation computer may be gained from reading the following detailed description in conjunction with the drawings, in which:

FIG. 4 is a geometric illustration of the terms constituting the mechanized equations; and FIG. 5 is a trigonometric illustration of the distance equation.

Figure 1:
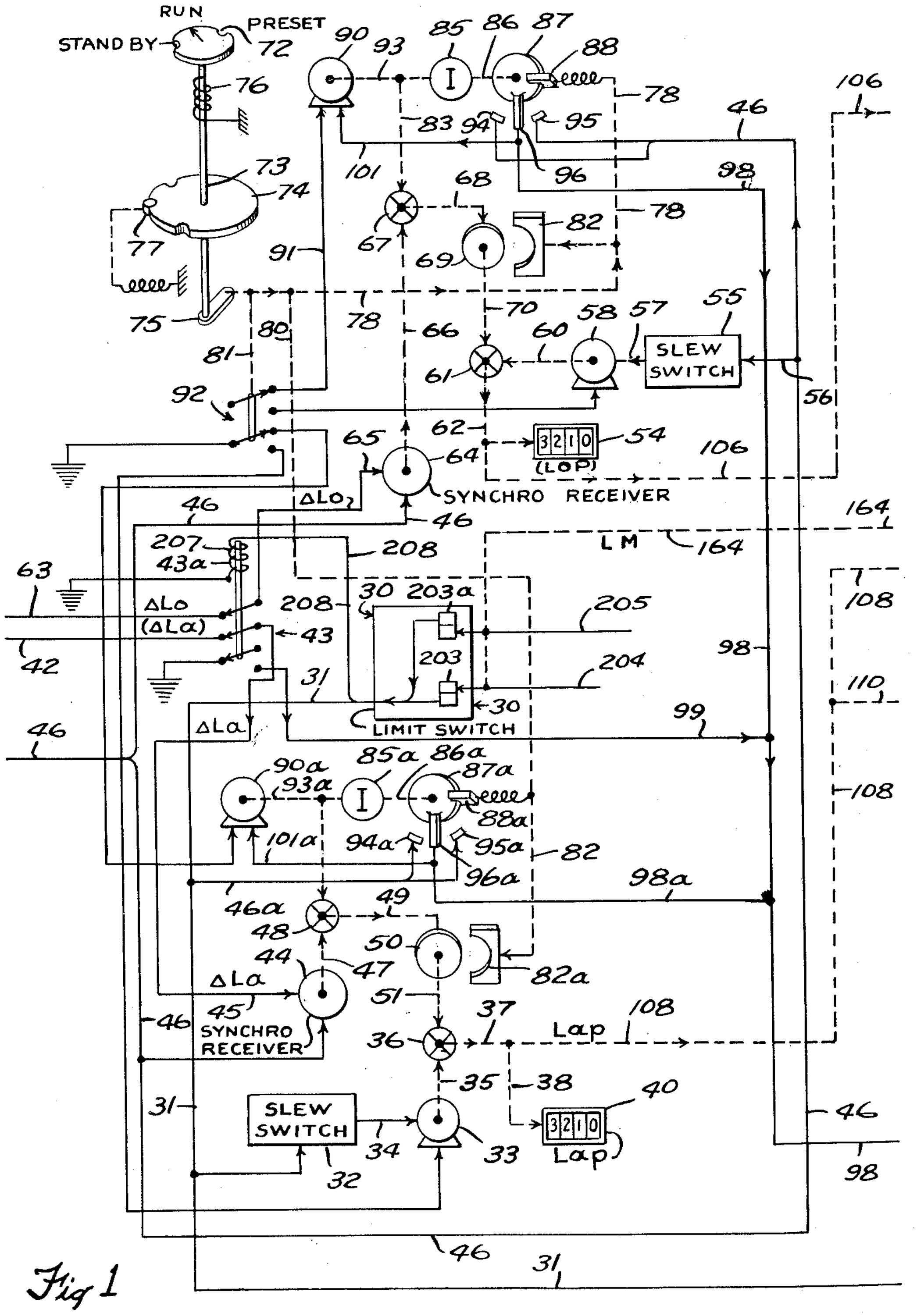
FIG. 1 is a schematic showing the position section of the computer.
Figure 2:
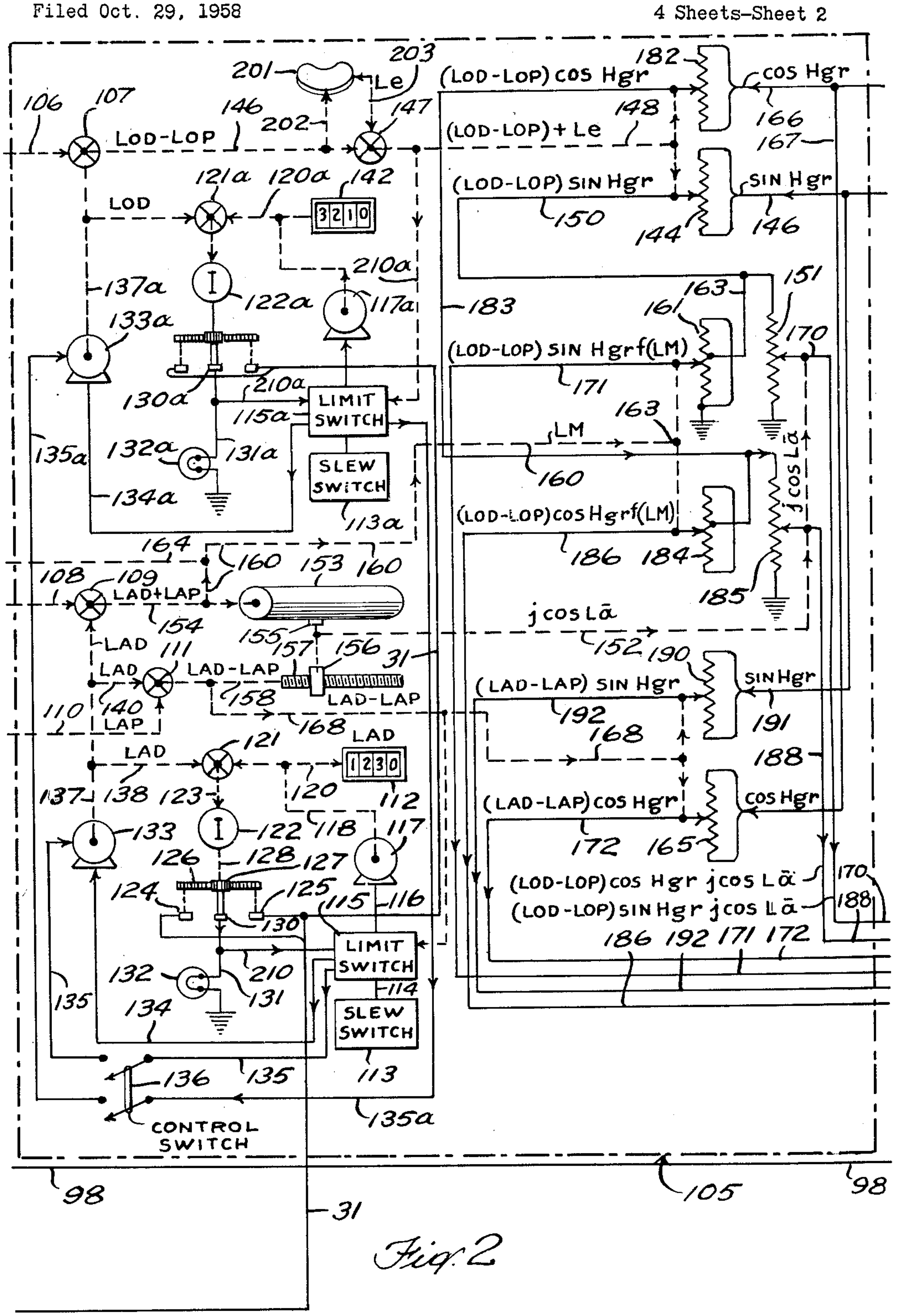
FIG. 2 is a schematic showing the principal components of the course and distance section of the computer.
Figure 3:
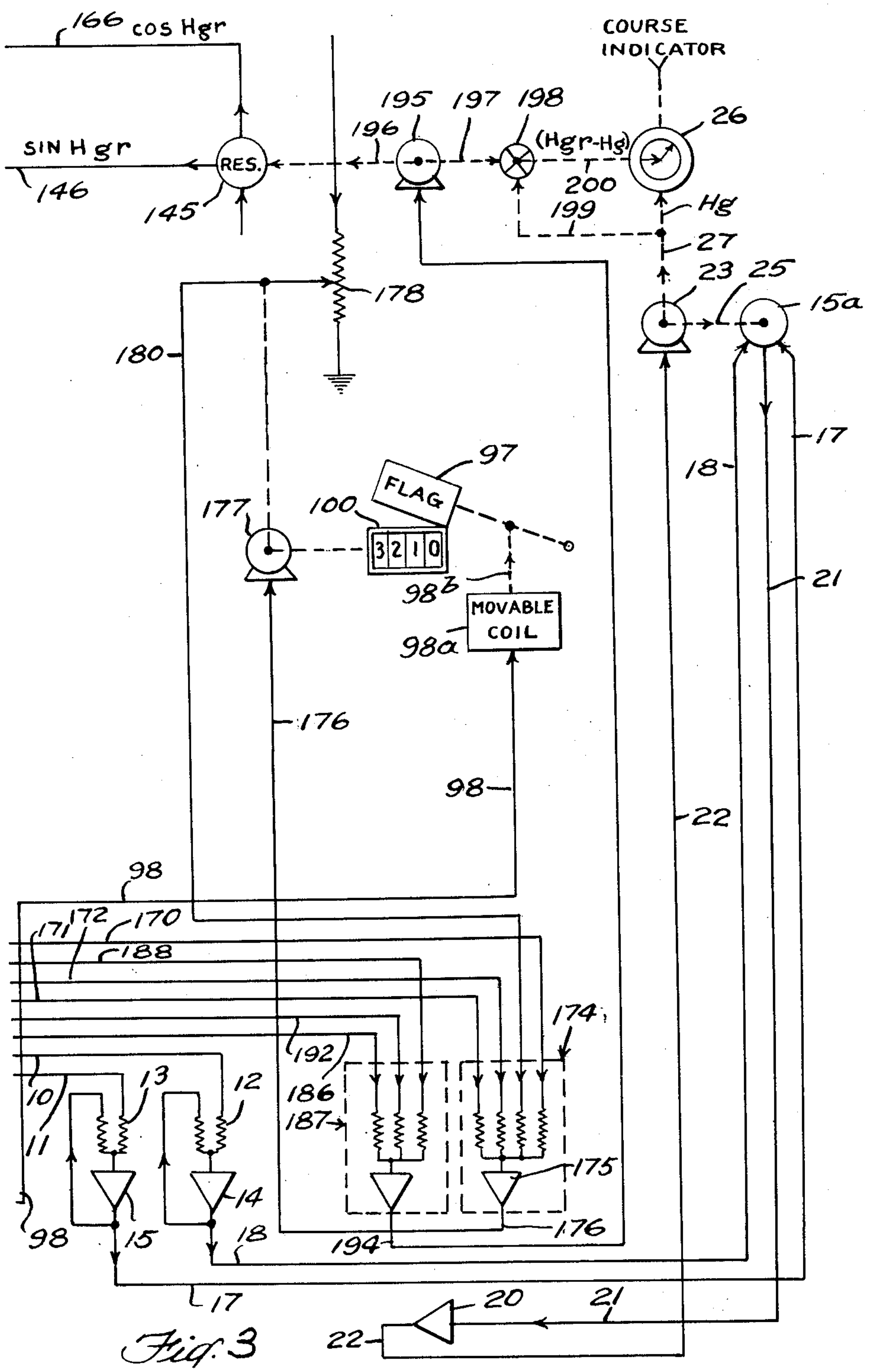
FIG. 3 is a schematic of the indicator section of the computer.

The rhumbline computer uses the following formulae in solving for (D) distance and (*Hgr*) heading to the destination:

$$(1)\quad D=(LOD-LOP)\,\overline{\cos La}\,\sin Hgr+(LAD-LAP)\cos Hgr$$

$$(2)\quad Hgr=\tan^{-1}\frac{LOD-LOP\,\overline{\cos La}}{LAD-LAP}$$

$$(3)\quad \overline{\cos La}=\frac{LAD-LAP}{\log_e(\sec \overline{LAD}+\tan \overline{LAD})-\log_e(\sec \overline{LAP}+\tan \overline{LAP})}$$

where LAP and LOP are latitude and longitude of present position, LAD and LOD are latitude and longitude of destination and cos *La* is the inverse mean secant over the rhumb line course.

GROUND TRACK MECHANISM

The ground track computer utilizes the voltages available at the wind potentiometers in the control computer shown in the copending application. One of these voltages is expressed by the following equation:

$$(4)\quad \cos Ht+\frac{V_w}{V_t}\cos H_w \text{ or } \frac{V_g}{V_t}\cos H_g$$

where $H_g$ is ground track, $H_t$ is true heading, $H_w$ is wind heading, $V_g$ is ground speed, $V_t$ is true speed and $V_w$ is wind speed.

Similarly, a wind potentiometer supplies a voltage representing:

$$(5)\quad \sin H_t+\frac{V_w}{V_t}\sin H_w \text{ or, } \frac{V_g}{V_t}\sin H_g$$

The two voltages expressed by Equations 4 and 5 represent north—south and east—west components of ground speed vector divided by true air speed and is supplied by lines 10 and 11 to one leg of networks 12 and 13 which are connected to resolver exciting amplifiers 14 and 15, respectively. See FIG. (3). The output of the amplifiers are fed back to the other leg of the networks which are provided to stabilize the voltages to a common scale factor for input to resolver 15. The amplifier outputs are applied by leads 17 and 18 to two spacequadrature stator windings in the resolver 15ᵃ. This excitation establishes a flux vector having an orientation equal to the ground track $H_g$.

The voltage induced in the rotor winding of the resolver 15ᵃ is fed to an amplifier 20 by means of lead 21. Amplifier output lead 22 controls motor 23 which nulls the induced voltage by driving the rotor winding to a position perpendicular to the flux vector. For this purpose shaft 25 links the motor 23 to the resolver 15ᵃ. A course indicator 26 is driven by the motor 23 through shaft 27 and indicates by its ring dial values representing ground track $H_g$.

PRESENT POSITION MECHANISM

A limit switch 30, which is adapted to supply selectively reference voltages of plus and minus polarity, is connected by lead 31 to slew switch 32. See FIG. (1). Slew motor 33 is controlled by the switch 32 through lead 34 and its armature shaft 35 drives one side of differential 36, the output of which is connected by means of shafts 37 and 38 to present latitude counter 40. Initial latitude is inserted on the counter by the operation of the slew switch.

Change in latitude ($\Delta La$), which is available as an analog voltage in the computer disclosed in the copending application, is impressed on line 42 and is fed through switch 43, which is controlled by relay 43ᵃ, to synchro receiver 44 on line 45. The synchro 45 may be referenced, as by power line 46. When the brake control system is in run position as described below, the synchro 44 drives through shaft 47, differential 48, shaft 49, drum 50 and drum shaft 51 to the other side of the differential 36 to produce present latitude (LAP) on the counter 40.

Present longitude (LOP) is indicated on counter 54. Slew switch 55 connected to the power line 46 by lead 56 is adapted to insert initial longitude on the counter 54 by means of lead 57, slew motor 58, armature shaft 60, one side of differential 61 and differential output shaft 62. Change in longitude ($\Delta Lo$) is received by synchro receiver 64 by line 63, switch 43 and lead 65 and is fed to the counter 54 by means of shaft 66, differential 67, differential output shaft 68, drum 69, drum shaft 70 and the other side of the differential 61.

If it is desired to reset the present position counters 40 and 54 by the use of the slew switches, the brake control system is employed to prevent the increments of longitude and latitude from entering the counters while they are being reset. This system comprises a knob 72 in driving mechanical connection with shaft 73 on which is mounted a notched position finder plate 74 and a link 75. A spring 76 is arranged on the shaft 73 to aid in turning the knob 72 and orienting the plate 74 so as to permit a spring biased pin 77 to be located in the proper notch for present position (PP) or reset position. The other notch is disposed in the plate so that the computer is operated with the brake system in run position as described above. Longitude reset shaft 78, latitude reset shaft 80 and ground switch shaft 81 are positioned by the link 75. The shaft 78 throws a connected brake 82 into braking engagement with the brake drum 69 to prevent increments of longitude from feeding into the counter 54. Instead the synchro receiver 64 continues to feed its incremental output to shaft 83 of the differential 67 and to intermittent 85 which may be a mutilated pinion adapted to store large values due to the preselected ratio of its driving and driven members. The output of the intermittent 85 is fed on shaft 86 to disc 87 which is permitted to turn when its locking pin 88 is withdrawn by the link driven shaft 78 by means not shown. Motor 90 is grounded by means of lead 91 through the switch 92 is de-energized when the switch is in reset position and its armature shaft 93 is driven by the intermittent 85. Change of position in longitude is thereby stored in the intermittent drive 85. The preset position counter 54 can then be reset to proper value by the slew switch 55. Positive and negative contacts 94 and 95 disposed on either side of disc arm 96 when the disc is in its locked position and energized by the lead 46 when the disc 87 is connected to a flag 97 by means of lead 98 movable coil unit 98ª and coil shaft 98ᵇ to cover distance counter 100 while the increments are being stored. The lead 98 is connected to ground through lead 99 and the switch 43.

In a similar manner, latitude increments may be stored to permit resetting of the counter 40. Elements for latitude storing which correspond to elements in the longitude storing system are assigned the same reference numerals with superscript *a* affixed. The line 46 is connected to the contacts 94ª and 95ª of the same disc 87ª by lead 46ª while lead 98ª connects the arm 96ª to the flag control line 98.

After the present position counters have been reset, the knob 72 is set back to run position releasing the brakes 82 and 82ª to permit the increments of position to resume feeding into the counters. The motors 90 and 90ª, which are energized by the line 46 through the contacts and arms of the contact discs and leads 101 and 101ª connecting the arms to the motors 90 and 90ª, are grounded on throwing the switch 92 into run position. The motors then serve to run out the stored information, which is added to the incoming increments in the differentials 67 and 48. When all the information has been run out of the intermittents, the contact discs return to their neutral positions, and the locking pins 88 and 88ª lock the discs in place.

DESTINATION MECHANISM

The destination computer 105 is mechanized according to Equation 1 which, it will be noted employs present position values. Thus shaft 106 driven by the shaft 62 feeds values of present longitude to differential 107 in the destination computer and shaft 108 feeds values of present latitude from the shaft 38 to differential 109 and by shaft 110 to differential 111 in the destination computer. See FIG. (2).

The latitude of destination (LAD) is indicated on counter 112. Slew switch 113 is connected to the counter 112 through lead 114, limit switch 115, lead 116, motor 117, motor shaft 118 and shaft 120, the slew switch being employed to insert this quantity on the counter. The shaft 120 is also connected to differential 121 which in turn is connected to the intermittent 122 by shaft 123. The intermittent positions follow-up contacts 124 and 125 as by rack 126 and pinion 127 through intermittent output shaft 128. Stationary contact 130 is connected by lead 131 to a light 132 which glows when the follow-up is in offset position, indicating that the counter reading of destination latitude is being stored.

When the contact is in the offset position the intermittent 122 is also connected through the lead 131, the limit switch 115 to a motor 133 by leads 134 and 135. Control switch 136 serves to connect the motor 133 to one of the follow-up contacts and place counter destination latitude on armature shaft 137 which is connected back to the intermittent by shaft 138 and the differential 121. The follow-up is centered to null position by the differential 121 when counter destination has been completely placed onto the armature shaft 137. The quantity is fed by the shaft 137 to the other side of the differential 109 and by the shaft 137 and shaft 140 to the other side of the differential 111.

In a similar manner values for longitude of destination may be stored in intermittent 122ª of the longitude destination system of the computer as it is inserted on the counter 142. The control switch 136 removes the stored value so as to place it in the other side of the differential 107. Elements in the longitude destination system corresponding to elements in the latitude destination system have been assigned the same reference numeral with superscript *a* affixed.

$\overline{\cos La}$ MECHANISM

In order to use $\overline{\cos La}$ with the greatest possible accuracy in Equation 1 the function is broken into two terms as follows:

$$(6) \qquad \overline{\cos La} = f(LM) + j\ \overline{\cos La}$$

where $f(LM)$ is a piecewise linear function of $$\left(\frac{LAD+LAP}{2}\right)$$

and the maximum value of $j\ \overline{\cos La}$ is 15% of $\overline{\cos La}$.

Substituting for $\overline{\cos La}$ in Equation 1 we have the following equation which is mechanized:

$$(7) \quad D = (LOD-LOP)j\ \overline{\cos La} \sin Hgr + (LOD-LOP)f(LM) \sin Hgr + (LAD-LAP) \cos Hgr$$

Accordingly, there is provided a potentiometer 144 which is referenced by synchro resolver 145 through lead 146 and is driven by the differential 107 through shaft 146, error correcting differential 147 and differential shaft 148. Potentiometer output $(LOD-LOP) \sin Hgr$ on lead 150 is impressed on distance potentiometer 151 which is driven by $j\ \overline{\cos La}$ shaft 152. As shown by Equation 3 the value $j\ \overline{\cos La}$ is a function of the quantities $(LAD+LAP)$ and $(LAD-LAP)$ and the function is represented on the barrel cam 153. The cam 153 is driven in rotation by the differential shaft 154 on which appears the quantity $(LAD+LAP)$. Cam follower 155 is position axially along the length of the cam 153 by a travel nut 156 mounted on a screw 157 which is driven by output shaft 158 of the differential 111. The quantity $(LAD-LAP)$ is represented on the shaft 158. The shaft 152 is driven in rotation by the cam follower 155 through gearing (not shown).

The shaft 154 is connected through a gear reducer (not shown) to shaft 160 which serves to position the slider of a second distance potentiometer 161 which is grounded at its end points and is energized by virtue of its center tapped connection 163 with the lead 150. The function (LM) appearing on the shaft 160 and representing one half the output of the differential 109 is placed in the limit switch 30 by shaft 164 which is in driven connection with the shaft 160. The operation of the limit switches is explained below:

The synchro resolver 145 feeds the quantity cos *Hgr* to a third distance potentiometer 165 by means of leads 166 and 167. Additionally, the potentiometer 165 is driven by shaft 168, which is connected to the shaft 158 and serves to position the slider of the third distance potentiometer.

The output $(LOD-LOP) \sin Hgr\, j\, \overline{\cos La}$ on output lead 170 of the potentiometer 151, the output $$(LOD-LOP)\ \sin Hgr\ f(LM)$$

on output lead 171 of the potentiometer 161 and the quantity $(LAD-LAP) \cos Hgr$ on output lead 172 of the potentiometer 165 is combined in the adding network and amplifier box 174 and the output of the amplifier 175 on lead 176 representing a distance solution satisfies Equation 7. Motor 177 is in driven connection with the distance counter 100 and a slider for potentiometer 178 the output of which on lead 180 is fed back to the amplifier box 174 to zero its output when the full analog value for distance has been generated by the motor 177.

COURSE MECHANISM

As shown by the problem geometry of FIG. 5, the line AB in the triangle ABC, the sides of which are established in accordance with Equations 1 and 2 is equal to $(LAD-LAP) \sin Hgr$ or $(LOD-LOP)\ \overline{\cos La} \cos Hgr$. Insofar as this equality is met, Equation 2 is satisfied. Hence, since $\overline{\cos La}$ is equal to $f(LM)+j\ \overline{\cos La}$, $(LAD-LAP) \sin Hgr$ must be equal to $$(LOD-LOP) j\ \overline{\cos La} \cos Hgr$$

plus $(LOD-LOP)\ f(LM) \cos Hgr$.

Accordingly, a voltage representing $\cos Hgr$ is impressed on potentiometer 182 by the lead 166. The slider of the potentiometer 182 is positioned by the shaft 148 in accordance with the error corrected output of the differential 147. Output lead 183 of the potentiometer 182 is connected to the center tap of course potentiometer 184, which is grounded on both sides, and to one side of a second course potentiometer 185. The slider of the potentiometer 184 is positioned by the (LM) shaft 160 and its output $(LOD-LOP) \cos Hgr\, f(LM)$, is impressed on lead 186 being fed by this lead to network amplifier box 187.

Similarly, the slider of the potentiometer 185 is positioned by the $j\ \overline{\cos La}$ shaft 152 and its output, $$(LOD-LOP) \cos Hgr\ j\ \overline{\cos La}$$

is impressed on lead 188 and is fed to the network amplifier box 187. A third course potentiometer 190 is energized by lead 191 which is connected to the sin $Hgr$ lead 146. Its slider is positioned by the $(LAD-LAP)$ shaft 168 and its output $(LAD-LAP) \sin Hgr$ on lead 192 is also fed to the network amplifier box 187.

The output of the network amplifier box 187 on lead 194 is a servo signal employed to drive motor 195. This motor drives the rotor of the resolver 145 by means of shaft 196 until the resolver outputs are the correct values of sin $Hgr$ and cos $Hgr$ to make the sum of the outputs of the course potentiometers 184 and 185 equal to the output of the potentiometer 190 and satisfy Equation 2. The servo motor therefore positions the resolver 145 at course angle $Hgr$.

The motor output $Hgr$ is also employed to displace input shaft 197 of differential 198. The other input side of the differential 198 is connected to the ground track motor 23 by means of connected shafts 27 and 199. Heading error $(Hgr-H_g)$ is fed to the course indicator 26 on shaft 200 which drives the zero reader pointer in the indicator.

LOADING ERROR CORRECTION CAM

Because potentiometers 144 and 182 are loaded by potentiometers 151, 161, 184 and 185, loading error cam 201, which is driven by the $(LOD-LOP)$ shaft 146 through shaft 202 and by cam follower shaft 203 drives one side of the differential 147, is provided to eliminate the large loading error which would otherwise be encountered. Since the input resistances of the potentiometers 151, 161, 184 and 185 are essentially contant, the loading error is only a function of the position of the sliders of the potentiometers 144 and 182. If there were no loading, potentiometers 151 and 182 would be positioned by $(LOD-LOP)$, the output of the differential 107. Instead, this function drives cam 201 in rotation, and provides one input to the differential 147. The cam 201 is so shaped that when the motion of its follower is added to $(LOD-LOP)$ in the differential 147, the sum $(LOD-LOP)+L_e$ positions the arms of potentiometers 144 and 182 such that the output voltage is the same as it would be if there were no loading error and $$(LOD-LOP)$$

positioned the sliders directly.

LIMIT SWITCHES

Because the equipment operates over a limited range, limit stops are required. However, in three of the gearing lines the gear ratios are so large that a mechanical limit stop would cause gear breakage rather than safely stop the line. Therefore, a system of electrical limit switches has been devised.

The potentiometers 161 and 184 are driven according to the input (LM) or $$\left(\frac{LAD+LAP}{2}\right)$$

Input motion may come from the motors 33, 90$^a$ or 133, or from the synchro receiver 44, and the torque level of any of these units may be enough to brake mechanical stops at the potentiometers. Therefore, the limit switch 30 having a pair of movable contacts 203 and 203$^a$ actuated by the (LM) shaft 164 is provided to interrupt the motion. The contacts receive voltages of opposite polarity on leads 204 and 205, respectively, and these contacts supply power of selected polarity to the motors on lead 31 and the synchro receivers 44 and 64 controlled by relay 207 which is connected to the limit switch by means of lead 208. Transmission to the synchro receiver is interrupted until (LM) falls below the limiting value when the limit switch is returned to its normal position, whereupon the motors may resume their running in the original direction.

The limit switches 115 and 115$^a$ are connected to the potentiometer input shafts 168 and 148 by shafts 210 and 210$^a$, respectively.

Accordingly, whenever the quantity $LAD-LAP$ exceeds the limiting values for the potentiometers 165 and 190 the limit switch 115 will break the connection between the motors 117 and 133. Specifically, the limit switch 115 will connect motor 117 to intermittent switch 130 whereby motor 117 will drive shafts 118 and 120 so as to center the contact 130. This automatically removes any stored destination information from the machine, making shafts 120 and 138 equal in value. Limit switch 115 automatically acts to excite motor 133 which changes LAD so as to reduce the magnitude of the quantity $LAD-LAP$ and thereby protect potentiometers 165 and 190. The action of contact 130 in conjunction with motor 117 is such as to continuously keep shafts 120 and 138 equal in value to each other. This action prevents intermittent 122 and contact 130 from hitting their mechanical limits and thereby assures the motion of motor 133, as required by limit switch 115. By virtue of the action of this mechanism we have preserved the present position LAP contained in the computer. The present position may continuously vary as necessitated by the aircraft flight regardless of how the destination section of the computer has been initially set. The action of intermittent 122 and contact 130 and limit switch 115 is such as to cause LAD to always be within a specified safe value of *LAD*—*LAP*, thereby protecting potentiometers 165 and 190.

A second function of limit switch 115 is to disconnect the slew switch 113 from servo motor 117 so that servo motor 117 cannot slew in a direction which will adversely effect the limiting conditions. By special design of the contact we may slew servo motor 117 by means of the slew switch 113 in a direction so as to reduce the magnitude of *LAD*—*LAP*.

In the longitude section the various motors and switches are suffixed with a letter *a*. They perform a similar function in the longitude section as already described for that of latitude so that potentiometers 182 and 144 are similarly protected, respectively.

DERIVATION OF FORMULAS

FIG. (4) and FIG. (5) show the problem geometry. At any point P along the rhumb line, using the incremental values ΔD, ΔL*o* and ΔL*a*, $$\Delta D \sin Hgr = R(\Delta Lo)\,\overline{\cos La} \qquad (1a)$$

$$\Delta D \cos Hgr = R(\Delta La) \qquad (2a)$$

Hence, $$\tan Hgr = \frac{\overline{\cos La}\,\Delta Lo}{\Delta La} \qquad (3a)$$

In the limit as ΔL*o* and ΔL*a* becomes infinitesimally small, $$\tan Hgr = \frac{(\overline{\cos La})\,dLo}{dLa} = \frac{dLo}{(\sec La)\,dLa} \qquad (4a)$$

Since H*gr* is constant for a rhumb-line course, integration between the aircraft position and the destination yields $$\tan Hgr = \frac{\int_{LOP}^{LOD} dLo}{\int_{LAP}^{LAD} (\sec La)\,dLa} \qquad (5a)$$

$$\tan Hgr = \frac{LOD-LOP}{\log_e(\sec LAD+\tan LAD)-\log_e(\sec LAP+\tan LAP)} \qquad (6a)$$

or, since $$\overline{\cos La} = \frac{LAD-LAP}{\log_e(\sec LAD+\tan LAD)-\log_e(\sec LAP+\tan LAP)} \qquad (3)$$

$$\tan Hgr = \frac{(LOD-LOP)\,\overline{\cos La}}{LAD-LAP} \qquad (6)$$

It is understood that changes in the computer may be effected without departing from the principle and scope of invention as defined in the appended claims, in which what is claimed is:

1. A rhumb-line computer comprising means for determining the difference in longitude between destination and present position (*LOD*—*LOP*), means for establishing the inverse means secant, $\overline{\cos La}$, over the rhumb-line course and means for determining the sine and cosine of the rhumb-line course, H*gr*, means for multiplying the quantities (*LOD*—*LOP*), $\overline{\cos La}$ and sine *Hgr*, means for determining the difference in latitude between destination and present position (*LAD*—*LAP*), means for multiplying the quantities (*LAD*—*LAP*) and cos *Hgr* and means for adding the two products, the means for establishing the quantity $\overline{\cos La}$ comprises means for determining the term $j\ \overline{\cos La}$ the maximum value of which is 15% of $\overline{\cos La}$ and means for determining $f(LM)$, a piecewise linear function of the term (*LAD*+*LAP*), the first mentioned multiplying means having means to multiply the quantities (*LOD*—*LOP*) and sin *Hgr* with the said two terms and combine the products, said establishing and determining means including means for continuously receiving increments of present longitude and latitude, means for introducing values for initial latitude and longitude and means selectively connected to said receiving and introducing means for storing the increments, whereby the increments may be stored while said introducing means are being operated to adjust the initial values or latitude and longitude, whereby the computer is adapted to generate distance quantities over the rhumb-line course.

2. A rhumb-line computer as claimed in claim 1 wherein the means for determining sine and cosine of the rhumb-line course, H*gr*, comprises a sine and cosine resolver, a motor in driving connection with said resolver, an adding network, means connected to the output of said resolver and the input of said network for multiplying the quantities (*LOD*—*LOP*), cos *Hgr* and $\overline{\cos La}$, means connected to the output of said resolver and the input of said network for multiplying the quantities (*LAD*—*LAP*) and sine *Hgr*, said network being connected to drive said motor, and there are provided additional incremental storing means which are selectively connected to the input of the differential longitude and latitude determining means whereby the output of said motor is the correct value for *Hgr* when the network output is zero.

3. A rhumb-line computer as claimed in claim 2 wherein potentiometers are employed as multiplying means and a load error correcting cam is driven according to the quantity (*LOD*—*LOP*), the output of the means for determining difference in longitude, and means are provided to combine the latter quantity with the output of said cam.

References Cited in the file of this patent

UNITED STATES PATENTS

| | | |
|---|---|---|
| 2,771,243 | Wolin et al. | Nov. 20, 1956 |
| 2,844,313 | Seliger | July 22, 1958 |

OTHER REFERENCES

Analog Methods in Computation and Simulation (Soroka), McGraw-Hill Book Co., 1954.

Frangoulis: Design Features of the ASN–7 Navigational Computer, IRE Transactions on Aeronautical and Navigational Electronics (September 1956), pages 108–112.

Electronic Analog Computers (Korn and Korn), McGraw-Hill Book Company, 1956.